United States Patent [19]

Worrell et al.

[11] Patent Number: 5,026,142
[45] Date of Patent: Jun. 25, 1991

[54] HOLLOW GLASS WAVEGUIDE

[75] Inventors: Clive A. Worrell, Sussex; Vladimir Skarda, Ashtead, both of United Kingdom

[73] Assignee: Cogent Limited, London, England

[21] Appl. No.: 424,283

[22] PCT Filed: Feb. 24, 1989

[86] PCT No.: PCT/GB89/00194
§ 371 Date: Oct. 20, 1989
§ 102(e) Date: Oct. 20, 1989

[87] PCT Pub. No.: WO89/08274
PCT Pub. Date: Sep. 8, 1989

[30] Foreign Application Priority Data

Feb. 26, 1988 [GB] United Kingdom ............... 8804523

[51] Int. Cl.⁵ ............................................. A02B 6/20
[52] U.S. Cl. ............................... 350/96.32; 350/96.34
[58] Field of Search .......................... 350/96.32, 96.34

[56] References Cited

U.S. PATENT DOCUMENTS

| | | | |
|---|---|---|---|
| 4,339,173 | 7/1982 | Aggarwal et al. | 350/96.34 X |
| 4,453,803 | 6/1984 | Hidaka et al. | 350/96.34 X |
| 4,652,083 | 3/1987 | Laakmann | 350/96.32 |
| 4,688,892 | 8/1987 | Laakmann | 350/96.32 |
| 4,778,249 | 10/1988 | Worrell | 350/96.32 |

Primary Examiner—John D. Lee
Assistant Examiner—Phan T. Heartney
Attorney, Agent, or Firm—Wolf, Greenfield & Sacks

[57] ABSTRACT

A hollow glass waveguide such as an optical fibre comprises a glass cladding containing in excess of 90 mole % germanium dioxide, the balance of the cladding being made up of modifying oxides such as network modifiers and intermediate modifiers. The use of high concentrations of germanium dioxide results in the waveguide having good optical properties in the 9-11 μm wavelength range e.g. low transmission losses. The incorporation of small quantities of modifying oxides produces improved physical properties e.g. better fibre drawing capability and reduced tendency to devitrification. A particularly preferred cladding contains 94 mole % $GeO_2$, 3 mole % $Na_2O$ and 3 mole % $Al_2O_3$.

16 Claims, 5 Drawing Sheets

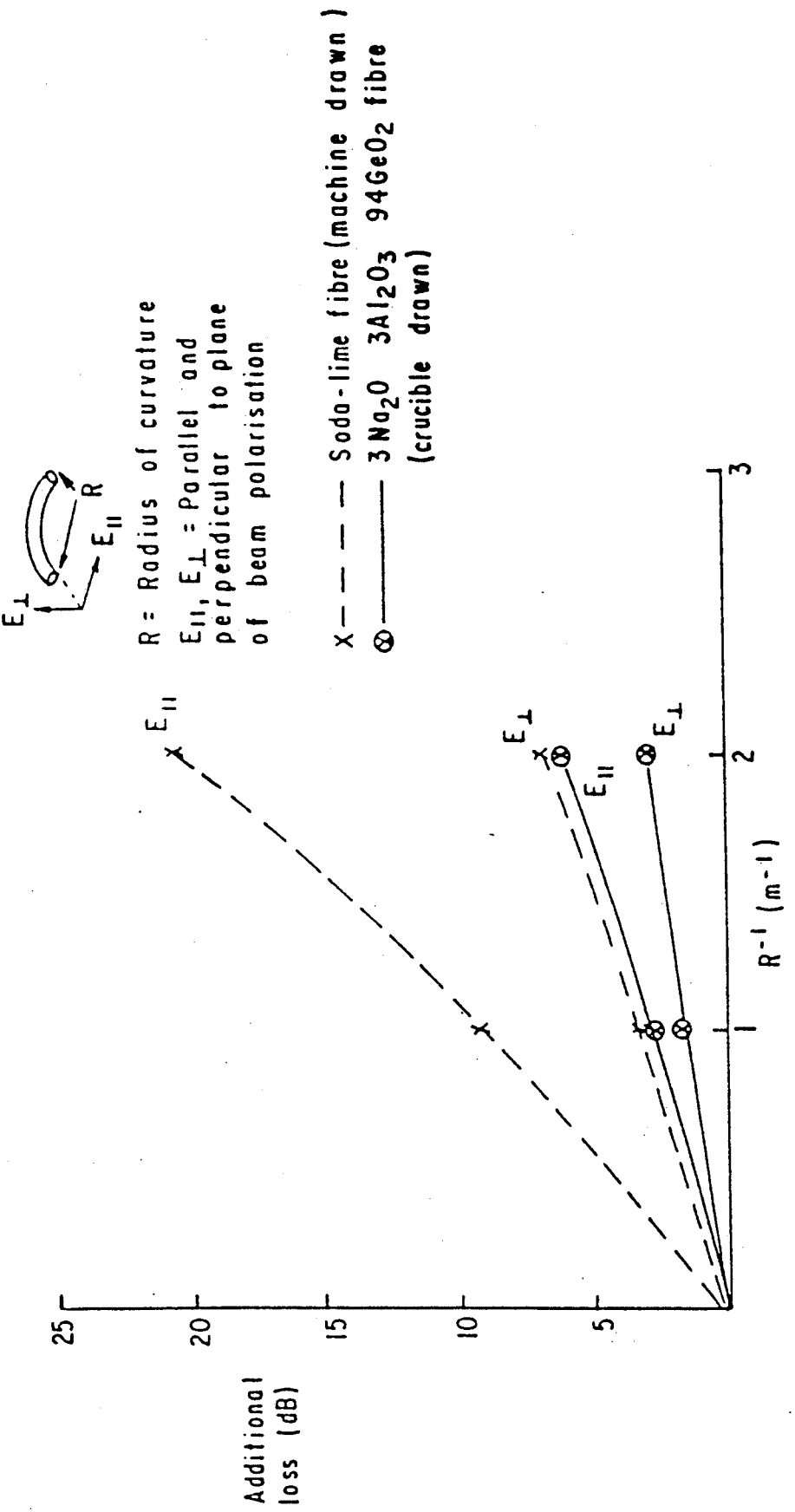

HOLLOW GLASS WAVEGUIDE

TECHNICAL FIELD

This invention relates to a hollow glass waveguide, e.g. an optical fibre, intended to operate in the wavelength range 9–11 μm.

BACKGROUND ART

The development of a flexible fibre for $CO_2$ laser power delivery is regarded as a prerequisite to the further diversification of this laser's applications concerning industrial and medical systems. Significant progress has been made in recent years towards the commercial realisation of such a fibre, and a number of potential materials and designs are being actively pursued.

The principal concern is the requirement to provide for high transmission at 10.6 μm both in straight guide, and around curvatures of a few centimeters radius. However, other properties of the fibre material do assume particular importance and these will depend on the application envisaged. For medical systems requiring flexible delivery of $CO_2$ laser energy, consideration on the choice of material should also take account of the associated fabrication costs, bio-compatibility (i.e. toxicity), photo-degradation, mechanical and environmental stability and also shelf-life. Such requirements tend to point towards a glass-forming material. However, as yet there does not appear to be a suitable glass which will fulfill all of these when constructed in solid core fibre form. Most glasses, in common with many other inorganic materials, exhibit strong absorption characteristics at mid infra-red frequencies due to resonance effects in the molecular structure, and are substantially opaque to such radiation.

Optical fibres in solid core form which do transmit at infra-red wavelengths have been made from certain crystalline halide materials. Examples of these are the KRS5 fibre developed by Horiba Ltd of Japan, (e.g. Ref. 1); and the silver chloride/silver bromide fibres of Katzir and Ariele (Ref. 2). However, these types of materials do pose a number of disadvantages when their mechanical and environmental properties referred to above are taken into consideration.

To address the problems associated with solid core type materials, there are a number of proposals which concern the fabrication of hollow waveguides. These include hollow metallic waveguides (Ref. 3), dielectric coated hollow metallic waveguides (Ref. 4,5), and hollow circular glass waveguides (Ref. 6). It is to hollow optical fibre waveguides of the last type which the present invention particularly relates. In this construction, the glass acts as a cladding to the fibre core which is air. Clearly to derive a condition of total internal reflection, and thus high transmission, the glass cladding must maintain a refractive index of less than unity at the wavelength of interest. Many inorganic materials, either in vitreous (i.e. amorphous) or crystalline form, exhibit strong anomalous dispersion in the mid-infrared to the extent that their refractive indices can assume values of less than unity at certain wavelengths. The physical processes governing the resonance absorption and dispersion effects are the molecular vibrational transitions of the material.

The utilisation of these effects and their wavelength turning to 10.6 μm for inorganic oxide glasses was first proposed by Hidaka et al (Ref. 7) in a novel approach to the development of a flexible waveguide. The material parameter of interest is the complex refractive index of the cladding which is defined as $\hat{N} = n - iK$, wherein n = refractive index, and K = extinction coefficient.

For the development of novel materials these optical constants need to be determined at infra-red wavelengths with reasonable accuracy and the values at 10.6 μm minimised for high transmission. A zero K value will give zero attentuation of the internally reflected radiation, but in practice this is virtually impossible to achieve, since it is a relatively high value of K which gives rise to the refractive index n being less than 1. This in turn provides the totally internal reflecting properties of the fibre. For any given glass, however, the maximum value of K is at a slightly longer wavelength than the minimum value of the refractive index, and generally speaking the minimum transmission loss of a hollow fibre waveguide made from the glass will be at a wavelength slightly shorter than the minimum value of refractive index. Also, since these parameters will depend on the atomic masses and molecular structure of the glass constituents, it follows that the composition of the glass from which the fibre is made will very much affect the performance of the fibre at a given wavelength.

It has been determined that the minimum refractive index of pure germanium dioxide ($GeO_2$) glass is very close to the $CO_2$ laser wavelength of 10.6 μm (943 $cm^{-1}$). Thus, germanium dioxide based glasses are potential hollow optical fibre waveguides for good transmission in this wavelength region. Indeed a hollow optical fibre waveguide made from a glass consisting of 80 mole % germanium dioxide, 10 mole % ZnO, 10 mole % $K_2O$ is described in the patent by T. Hidaka (Ref. 6). Similarly, EP-A-0249886 discloses a method for the manufacture of hollow glass fibres of silica which are provided with a glass cladding on their internal surface. Claddings of 80 mole % and 100 mole % $GeO_2$ are exemplified as suitable for manufacture by the disclosed method.

DISCLOSURE OF THE INVENTION

With the aim of improving the fabrication of hollow optical fibre waveguides whilst at the same time optimising transmission loss at 10.6 μm, according to the present invention, the inventors propose a hollow optical fibre which is made from a germanium dioxide based glass which contains stabilising oxide additives but in much smaller amounts than previously envisaged. It is demonstrated that the quantities of oxide additions to the base glass ($GeO_2$) are important parameters in the optimisation of the waveguide material and hence its transmission loss at 10.6 μm (943 $cm^{-1}$). The improvements derived are demonstrated by comparing optical data of preferred glass compositions with those obtained for glass compositions already known in the prior art.

Thus the present invention proposes a hollow glass waveguide comprising a glass cladding containing germanium dioxide ($GeO_2$) and at least one modifying metal oxide. In contrast to the proposals of the prior art the concentration of $GeO_2$ present in the cladding is in excess of 90 mole %. Binary combinations of $GeO_2$ and PbO which are already known from GB-A-2169597 do not form part of the present invention.

Various metal oxides are suitable for inclusion in the cladding as modifying metal oxide. For example a network modifier such as $K_2O$, $Li_2O$ or $Na_2O$ may be included for improving the physical properties of the glass cladding. Another possibility is to include an intermediate modifier such as ZnO, Al$_2$O$_3$, Sb$_2$O$_3$, PbO or Bi$_2$O$_3$ which tend to inhibit spontaneous devitrification of the cladding. In particular preferred embodiments of the present invention both a network modifier and an intermediate modifier are present in the cladding.

Where GeO$_2$ is employed in bindary combination with a modifying metal oxide preferred metal oxides for improving the optical properties of the optical fibre are Li$_2$O, Na$_2$O, ZnO, Al$_2$O$_3$ and Sb$_2$O$_3$. Of these Li$_2$O and Na$_2$O also give enhanced physical properties such as good workability, while Sb$_2$O$_3$ results in particularly good optical properties.

In preferred embodiments of the present invention the glass cladding comprises at least 93 mole % GeO$_2$, particularly preferably at least 94% and optimally at least 95%. Usually there will be not more than 99 mole % GeO$_2$ present. Particularly preferred claddings of the present invention are ternary combinations of GeO$_2$, a network modifier and an intermediate modifier. In such ternary combinations the concentration of GeO$_2$ is preferably not more that 99 mole % while each of the modifiers may be present in amounts of from 0.5 to 9.5 mole %. Where both a network modifier and an intermediate modifier are present a preferred example of the former is Na$_2$O and of the latter is Al$_2$O$_3$. Thus a particularly preferred cladding comprises around 94 mole % GeO$_2$, around 3 mole % of Na$_2$O and around 3 mole % of Al$_2$O$_3$.

In other embodiments GeO$_2$ is used in combination with at least two modifying metal oxides selected from K$_2$O, Li$_2$O, Na$_2$O, PbO, ZnO, Sb$_2$O$_3$ and Al$_2$O$_3$.

The cladding of the present invention may be provided as an inner lining on an optical fibre of another glassy material or, alternatively may be used in its naked state.

BRIEF DESCRIPTION OF THE DRAWINGS

FIG. 8 presents the bending loss data for hollow glass waveguides.

MODES FOR CARRYING OUT THE INVENTION

Figure 1:
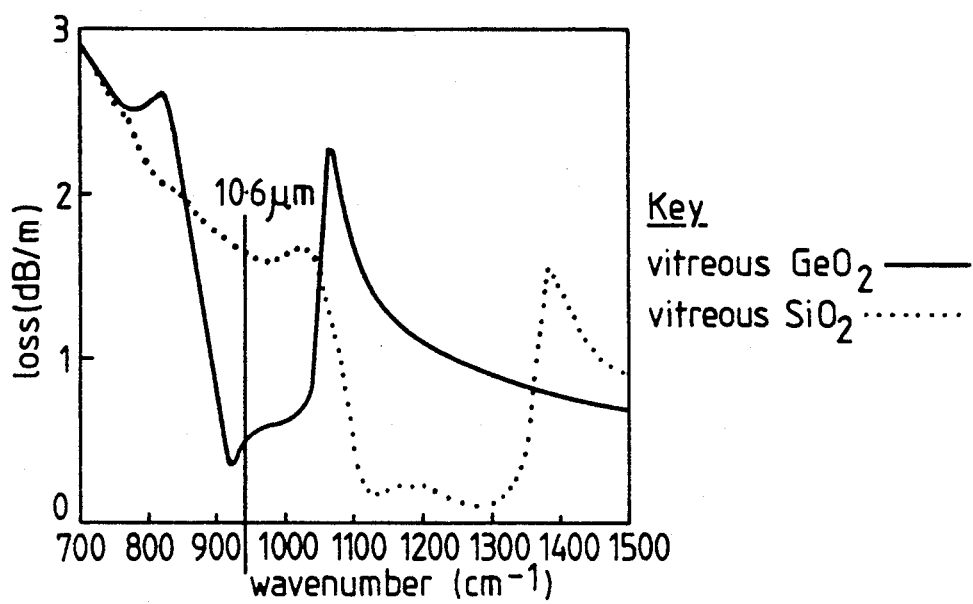
FIG. 1 presents the predicted waveguide loss spectrum (EH$_{11}$ mode, 1 mm bore) for vitreous GeO$_2$ and vitreous SiO$_2$.

The principles of the present invention are based on a knowledge of the optical parameters of the glass, the refractive index n, and extinction coefficient K, as embodied in the complex refractive index ($\hat{N} = n - iK$). These parameters need to be determined with reasonable accuracy over the wavelength range of interest; this was selected to be 5–55 μm. The method employed for the determination of n and K is that based on a Kramers-Kronig analysis of the measured reflectance spectrum for each glass at normal incidence. Details of this procedure have been described previously (Ref. 8). With these data an assessment of a given material as a potential waveguide can then follow using the analytical expression of Marcatili & Schmeltzer (M & S, Ref. 9). For the EH$_{11}$ mode, which is the lowest loss mode for a circular dielectric waveguide, the amplitude attentuation coefficient, α, is given for a straight guide by equation 1.

$$\alpha = \left(\frac{U}{2\pi}\right)^2 \frac{\lambda^2}{2\pi} Re\left\{\frac{\frac{1}{2}(\hat{N}^2 + 1)}{\sqrt{(\hat{N}^2 - 1)}}\right\} \quad (1)$$

In the above equation U is a numerical mode dependent constant, λ the wavelength, a the wavegide radius, and N the complex refractive index. The glasses developed are assessed in terms of a power loss spectrum (i.e. dB/m) for a 1 mm bore waveguide.

Following the work of Hidaka (Ref. 7), it seems likely that glasses based on germanium dioxide are going to be the most appropriate in terms of the anomalous dispersion effect and its frequency tuning to 10.6 μm. Vitreous germanium dioxide therefore forms the starting point. Increasing oxide additions to the base glass (i.e. GeO$_2$) were made. Simple binary and ternary compositions were formulated to determine the effects on the bulk optical properties n & K. At the same time the glasses were assessed for their stability on casting (i.e. absence of spontaneous devitrification), melting temperature, viscosity working range and thus fibre drawing capability. The oxide additions included network modifiers such as the alkali oxides (K$_2$O, Li$_2$O and Na$_2$O), and intermediate modifiers which are likely to inhibit spontaneous devitrification (e.g. ZnO, Al$_2$O$_3$, Sb$_2$O$_3$, PbO and Bi$_2$O$_3$).

Glass compositions depicted in Table 1 were melted in the temperature range 1000° C. to 1600° C. using recrystallised alumina crucibles. Each glass was cast and pressed to form a slab which was subsequently ground and polished for normal incidence specular reflectance measurements. The Kramers-Kronig analysis of this data then followed using the procedure previously described (Ref. 8).

The optical properties of the glasses evaluated are summarised in Table 1. This includes the refractive indices, extinction coefficients and predicted waveguide losses (dB/m, M & S theory, EH$_{11}$ mode). These predictions are made for a 1 mm bore guide transmitting at 943 cm$^{-1}$ (i.e. 10.6 μm) and at the wavenumber/wavelength of minimum loss. The predicted losses as a function of wavenumber (cm$^{-1}$), i.e. power loss spectrum, are also presented graphically in FIGS. 1-6, and serve to illustrate the effects of the various oxide additions to the base glass GeO$_2$.

The spectra presented in FIG. 1 compare the results for vitreous germanium dioxide with vitreous silica and demonstrate the potential advantages that will result in the development of a GeO$_2$ based glass for frequency tuning the anomalous dispersion to around 10.6 μm. The optical propeties for these materials are given in Table 1. For vitreous GeO$_2$, the refractive index and extinction coefficient at 10.6 μm are 0.57 and 0.82 respectively with a predicted loss of <0.5 dB/m. At 10.85 μm (i.e. the wavelength of minimum loss) these parameters are 0.42, 1.23 and 0.35 dB/m respectively. Since this wavelength is longer that the selected wavelength of 10.6 μm, it is most likely that any further oxide additions to the base glass will not derive any improvement with regard to the transmission properties of the waveguide. It is generally known that network modifying oxides in SiO$_2$ based glasses tend to displace to longer wavelengths the infra-red absorptions associated with the molecular bond-stretching vibrations. Thus, it would seem that further frequency tuning of the optical constants by such additions might be inappropriate for $GeO_2$ glasses as this could merely displace to longer wavelengths the minimum in the refractive index. Ideally, a displacement to shorter wavelengths would be required. This point is clearly demonstrated in the comparative examples of FIG. 2 and Table 1 for a series of lead germanate glasses which have increasing additions of PbO. As the amount of PbO is increased, both the predicted loss at 10.6 μm increases, and the minimum loss for each glass increases and is displaced to longer wavelengths. These general observations and specific values in n & K for $GeO_2$ are in agreement with the work of Wilson Ref. 10). Scheggi et al (Ref. 11) and Zoltarev and Morozov (Ref. 12). However, they do differ significantly with those of Hidaka who claims that further frequency tuning of the optical constants, n & K for $GeO_2$ is desirable.

Although this work suggests that pure $GeO_2$ glass would appear to be the best material in terms of the optical requirements, it does pose disadvantages in fabrication and glass stability. It is particularly viscous at melt temperatures below 1400° C., and tends to be volatile at temperatures above this value. It is also prone to surface devitrification when exposed to atmosphereic moisture. With these limitations in mind, the present invention defines a compositional range of glasses based on germanium dioxide which minimises the predicted transmission losses at 10.6 μm whilst providing improvement to glass stability and fibre drawing.

The data in Table 1 shows that as the mole % concentration of $GeO_2$ is reduced, and inparticular below 90%, the predicted waveguide losses at 10.6 μm increase. However, there are some significant variations, and these depend on the type of modifying oxide present. Thus 5 mole % $Al_2O_3$, $Sb_2O_3$ for glasses 10 and 12 respectively will derive lower waveguide losses than 5 mole % $Bi_2O_3$ as in glass 11, see FIG. 4. Similarly, for the alkali oxides, the additions of $Na_2O$ and $Li_2O$ would appear to be slightly more beneficial than the equivalent composition involving $K_2O$, see FIG. 3. In general, glass compositions of the type 9-12 in Table 2 were more difficult to melt and work into fibres than the remaining compositions, and particularly when compared with those containing the alkali oxides. The working range of the lead based binary glasses was difficult to control, although addition of $Al_2O_3$ does help to improve fibre drawing characteristics. Nevertheless, the exclusion of heavy metal oxides from the glass is desirable on health and safety considerations.

Figure 2:
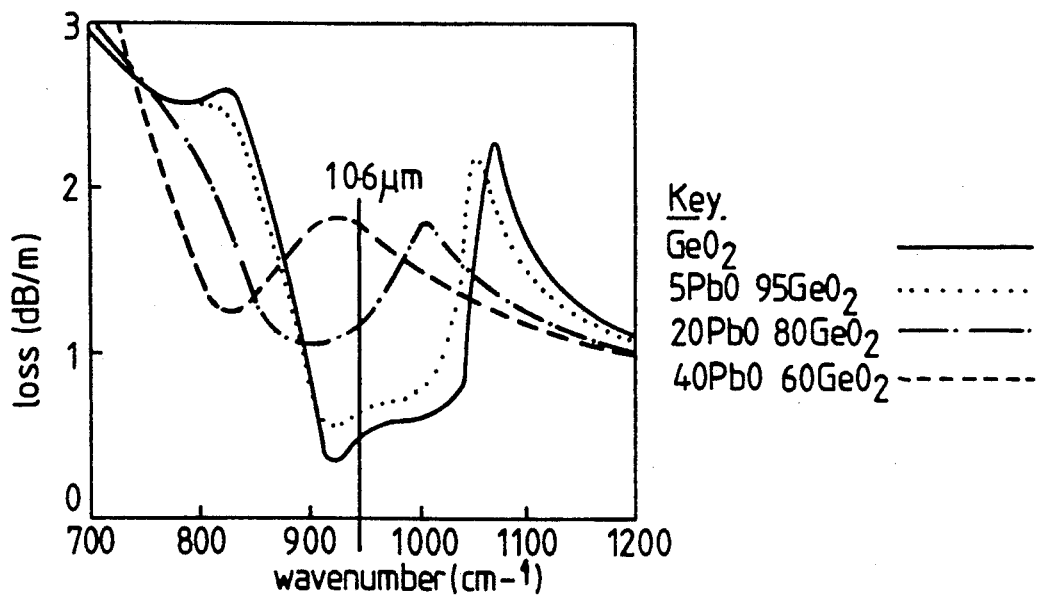
FIGS. 2-6 present the predicted waveguide loss spectra (EH$_{11}$ mode, 1 mm bore) for a series of germania based glasses.
Figure 3:
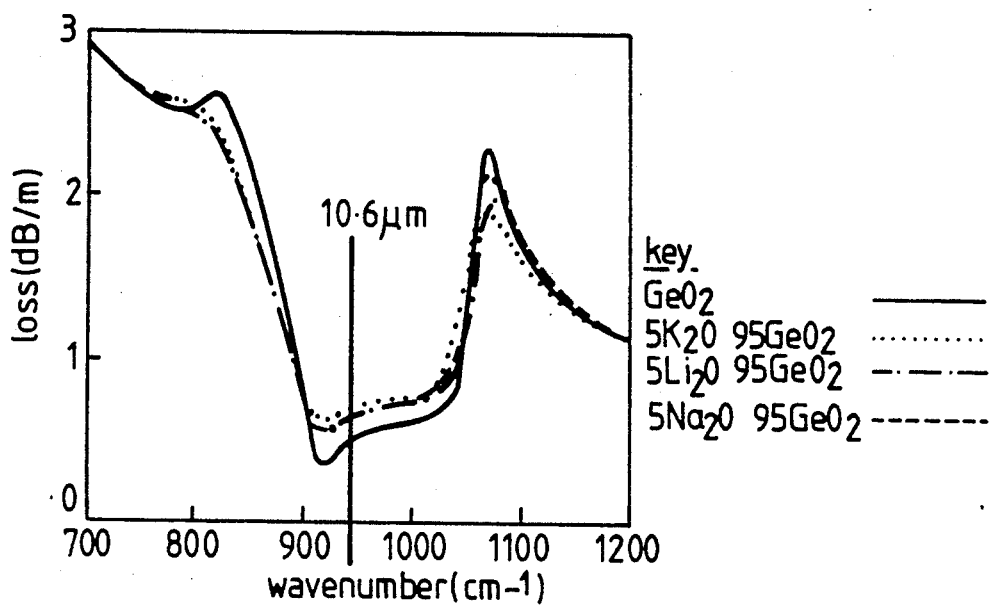
Figure 4:
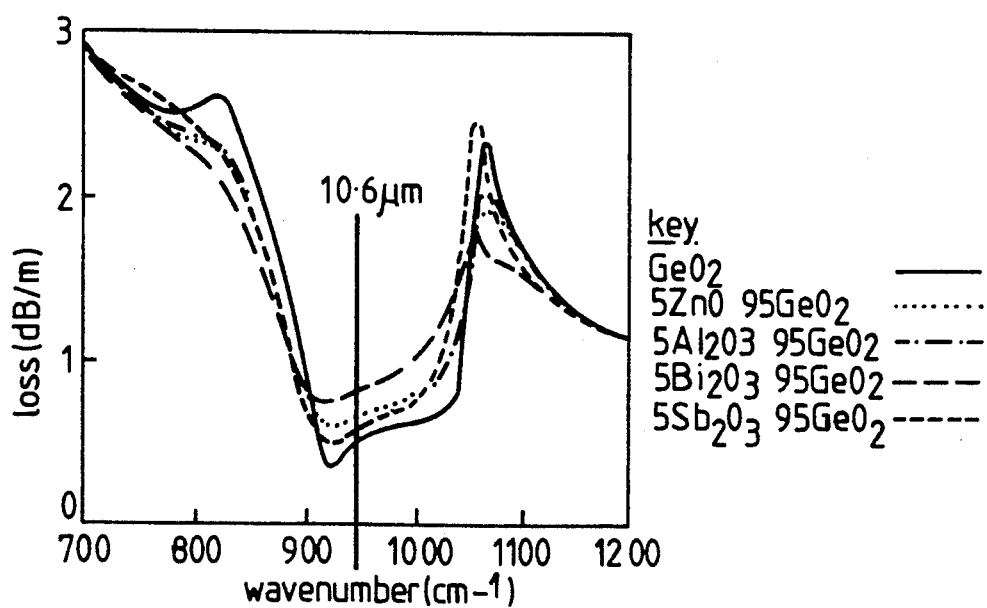
Figure 5:
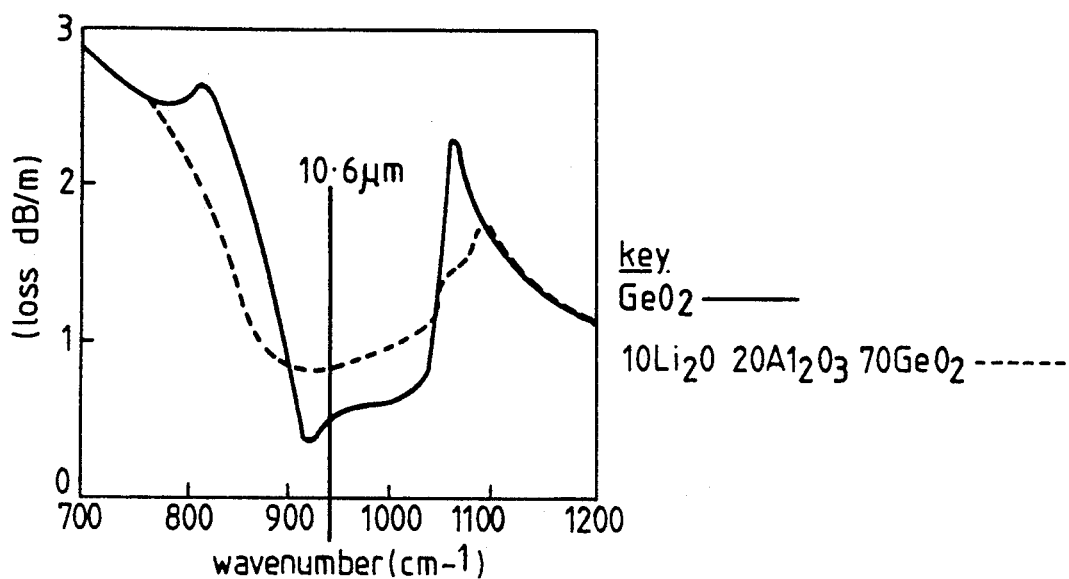
Figure 6:
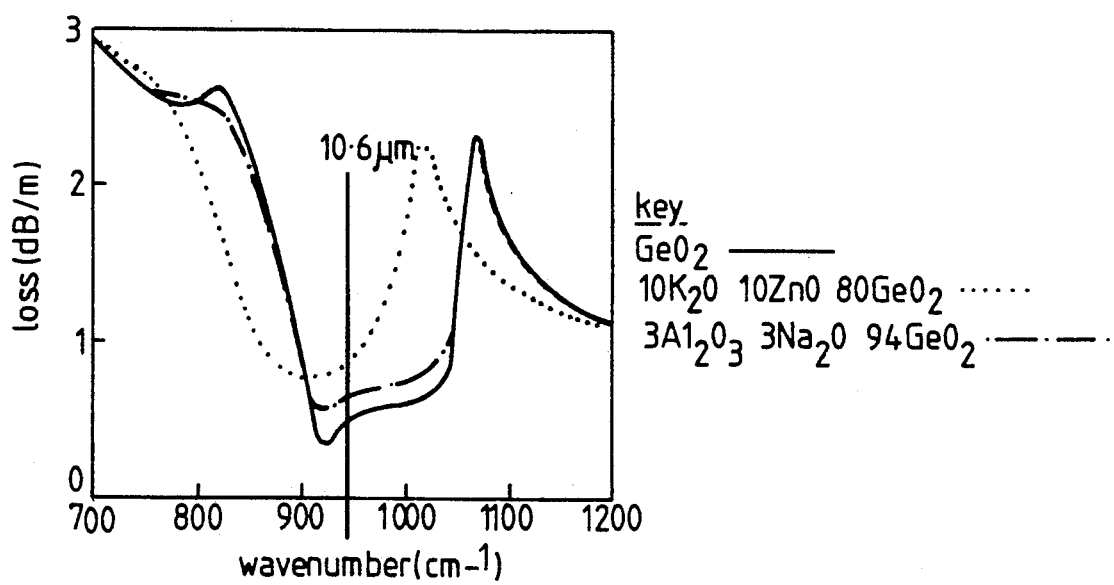

Glasses with higher concentrations of modifying oxides, i.e. greater than 10 mole % in total, gave predicted losses of around 0.8-1.8 dB/m (see Table 1, glasses 4,5,13,14 and FIGS. 2,5 and 6). Since these represent a significant increase on the predictions for pure $GeO_2$, these data suggest that a $GeO_2$ content greater than 90 mole % is preferred. Glass composition 14 which is claimed in the prior art (Ref. 6) as a $CO_2$ laser waveguide material, predicts a waveguide loss approximately 50% greater than that given for glass composition 15 (see Table 1 and FIG. 6). This latter composition, i.e. $3Na_2O$ $3Al_2O_3$ $94GeO_2$ (mole %e is preferred when the predicted waveguide loss and glass fabrication parameters are taken into account. Thus, it is seen that an improvement on previously known glasses for a $CO_2$ waveguide can be derived by relatively small additions of less than 10 mole % in total of alkali oxides such as $Na_O$, $Li_2O$ and $K_2O$, and in particular in combination with $Al_2O_3$ to improve fibre drawing properties. To demonstrate the benefits of glass composition $3Na_2O$ $3Al_{2O3}$ $94GeO_2$, hollow waveguides were pulled from a crucible containing a melt of this composition. A simple glass blowing/drawing technique was applied and fibres of approximately one meter in length and 1 mm internal diameter (i.d.) were prepared for laser power transmission measurements. These measurements were made using a $CO_2$ waveguide laser operating in $TEM_{oo}$ mode at 10.6 μm wavelength. The laser beam was focused at the fibre input end via a 300 mm focal length KCl lens, and the power output was measured using a thermopile power meter. For straight waveguide attenuation measurements, the fibres were aligned with supporting "V" channel sections mounted on an optical bench. The method of cut-back was applied in which the power transmitted by a fibre was recorded before and after a length of the fibre had been removed. Waveguide loss (dB/m) was then calculated according to equation 2.

$$\text{Loss(dB/m)} = \frac{10}{\Delta x} \log \left[ \frac{P_2}{P_1} \right] \quad (2)$$

$\Delta x$ = length of fibre removed(m)
$P_1$ = power transmitted before removed
$P_2$ = power transmitted after removal.

Some measurements of the additional losses due to fibre bending were also made to demonstrate further the benefits of this invention. These were determined by first measuring the fibre power output in straight guide and then remeasuring after bending the fibre to a known curvature. The bending arcs were approximately 0.5 m, with radii of 100 and 50 cm respectively. Fibres were measured with approximately 20 cm of straight guide on either side of the curved section and they were bent both parallel and perpendicular to the plane of polarisation of the laser beam.

For each set of measurements (i.e. bent and straight), comparative data for a soda-lime glass fibre were also obtained. These fibres were machine drawn (i.e. redrawn preform), and, as such, were of greater precision on bore than the germania glass fibres drawn from the crucible melt. The soda-lime glass has optical parameters, i.e. n&K, of approximately 2.3 and 0.6 respectively, and for a 1 mm bore predicts a waveguide loss of 1.7 dB/m according to equation 1 (M&S). Clearly this glass, which is silica based, does not have n<1 at 10.6 μm, and thus serves to demonstrate the advantage of tuning the anomalous dispersion effect to 10.6 μm (i.e. n<1).

Figure 7:
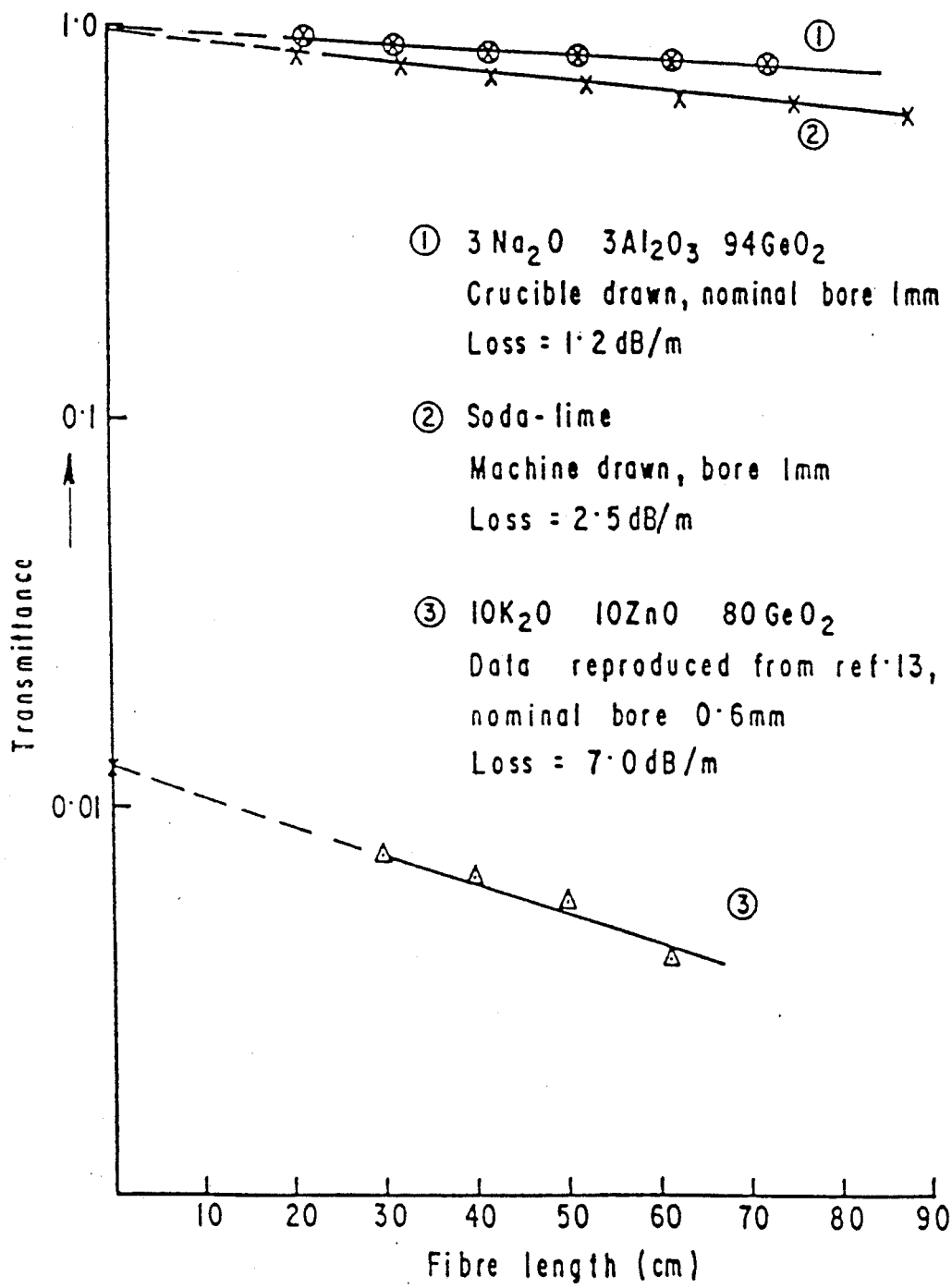
FIG. 7 presents the measured transmittance of 10.6 μm wavelength radiation by hollow glass waveguides of various compositions.

A summary of the straight waveguide losses are presented in FIG. 7. Those measured for bent fibres are given in FIG. 8. Also included in FIG. 7 are the date for Hidaka's glass composition, i.e. $10K_2O$ $10ZnO$ $80GeO_2$ (mole %) fibre 3. This data has been reproduced from Hidaka (Ref. 13) and represents part of the prior art. For glass composition $3Na_2O$ $3Al_2O_3$ $94GeO_2$, fibre 1, the slope of the attenuation versus fibre length measured 1.2 dB/m, whereas the soda-lime composition, fibre 2, a value of 2.5 dB/m was obtained. These data are for nominal 1 mm bore, with the machine drawn soda-lime having a precision on bore of better than 2%, and the crucible drawn germania glass of around 5%. Hidaka's data measures approximately 7 dB/m for a nominal bore of 0.6 mm. Although it is known that bore size will have a most significant effect on transmission (see equation 1, i.e. the $1/a^3$ dependency, wherein a is the waveguide radius), it is considered misleading to apply a $1/a^3$ normalisation to 1 mm for Hidaka's data. The 10 dB of coupling loss indicated in his results suggests multi-mode or higher order mode propagation, and thus, a comparison of measured transmission values is more appropriate. The mismatch between theory and experiment for fibres 1, 2 is almost certainly due to the excitation of higher order loss modes as a result of variations in waveguide bore. Whereas this will also apply to Hidaka's data, i.e. fibre 3, the optical constant data in Table 1 for glass compositions 14, 15 suggest that the lower loss measured for fibre 1 is partly due to better tuning of the optical parameters, n&K, through smaller additions of modifying oxides to the base glass $GeO_2$.

Further benefits of the glass composition claimed are particularly evident in the data of FIG. 8, i.e. bending loss. These data clearly demonstrate a significant reduction in waveguide loss with bending for glass $3Na_2O$ $3Al_2O_3$ $94$ $GeO_2$ when compared to the soda-lime composition. This confirms the importance of reducing n&K at 10.6 μm, and in particular that n is less than unity.

TABLE 1

Summary of optical properties of germanium dioxide based glasses
Refractive index, n, extinction coefficient, K, and predicted loss
(dB/m, $EH_{11}$ mode) for 1 mm bore guide

| No. | Glass composition Mole % | Properties at 943 $cm^{-1}$ (10.6 μm) | | | Properties at wavelength of minimum loss | | | |
|---|---|---|---|---|---|---|---|---|
| | | n | K | dB/m | n | K | dB/m | $cm^{-1}$, (μm) |
| *1 | $SiO_2$ | 2.04 | 0.08 | 1.66 | 0.54 | 0.14 | 0.10 | 1273, 7.86 |
| *2 | $GeO_2$ | 0.57 | 0.82 | 0.48 | 0.42 | 1.23 | 0.35 | 922, 10.85 |
| *3 | $5PbO\ 95GeO_2$ | 0.72 | 0.74 | 0.64 | 0.66 | 0.94 | 0.58 | 929, 10.76 |
| *4 | $20PbO\ 80GeO_2$ | 1.03 | 0.42 | 1.16 | 1.02 | 0.68 | 1.05 | 907, 11.03 |
| *5 | $40PbO\ 60GeO_2$ | 1.34 | 0.09 | 1.76 | 1.07 | 0.84 | 1.24 | 829, 12.06 |
| 6 | $5K_2O\ 95GeO_2$ | 0.77 | 0.71 | 0.70 | 0.70 | 1.06 | 0.62 | 920, 10.87 |
| 7 | $5Li_2O\ 95GeO_2$ | 0.72 | 0.77 | 0.64 | 0.68 | 0.96 | 0.59 | 929, 10.76 |
| 8 | $5Na_2O\ 95GeO_2$ | 0.73 | 0.73 | 0.65 | 0.68 | 0.99 | 0.59 | 925, 10.81 |
| 9 | $5ZnO\ 95GeO_2$ | 0.72 | 0.76 | 0.64 | 0.67 | 1.06 | 0.58 | 925, 10.81 |
| 10 | $4Al_2O_3\ 95GeO_2$ | 0.66 | 0.76 | 0.58 | 0.59 | 0.99 | 0.51 | 929, 10.76 |
| 11 | $5Bi_2O_3\ 95GeO_2$ | 0.84 | 0.65 | 0.79 | 0.81 | 0.80 | 0.74 | 929, 10.76 |
| 12 | $5Sb_2O_3\ 95GeO_2$ | 0.67 | 0.68 | 0.59 | 0.56 | 1.06 | 0.49 | 920, 10.87 |
| *13 | $10Li_2O\ 20Al_2O_3\ 70GeO_2$ | 0.86 | 0.63 | 0.82 | 0.85 | 0.73 | 0.80 | 929, 10.76 |
| *14 | $10K_2O\ 10ZnO\ 80GeO_2$ | 0.87 | 0.38 | 0.90 | 0.80 | 0.75 | 0.80 | 898, 11.14 |
| *15 | $3Na_2O\ 3Al_2O_3\ 94\ GeO_2$ | 0.72 | 0.8 | 0.63 | 0.64 | 1.24 | 0.54 | 920, 10.87 |

* = comparative example

REFERENCES

1. S. Sakuragi: 'Polycrystalline KRS-5 infra-red fibers for power transmission', Proc. SPIE. Vol. 320, Advances in Infrared Fibers II, (1982).
2. A. Katzir, R. Arieli: 'Long wavelength infra-red optical fibers', J. Non. Cryst. Solids, 47, pp. 149–158, (1982).
3. E. Garmire: 'Research in infra-red hollow waveguides', Proc. SPIE Vol. 320, Advances in Infra-red Fibers II, (1982).
4. M. Miyagi et al: 'Fabrication of germanium-coated nickel hollow waveguides for infrar-red transmission', Appl. Phys. Lett. 43, (5), pp. 430–432, (1983).
5. K. Laakmann: 'Hollow Waveguide', U.S. Pat. No. 4,652,083, 1987.
6. T. Hidaka et al: 'Optical waveguide for middle infra-red band', U.S. Pat. No. 4,453,803, (1984).
7. T. Hidaka, T. Morikawa and J. Shimada: 'Hollow-core oxide-glass clading optical fibers for middle infra-red region', J. Appl. Phys., 52, (7), pp 4467–4471, (1981).
8. C. A. Worrell: 'Infra-red optical constants for $CO_2$ laser waveguide materials', J. Mat. Sci, 21, pp 781–787, (1986).
9. E. A. J. Marcatilli & R. A. Schmeltzer: 'Hollow metallic and dielectric waveguides for long distance optical transmission and lasers', Bell. Syst. Tech. J., 43, pp 1783–1809, (1964).
10. S. J. Wilson: 'Hollow core glass waveguides', Proc. SPIE, Vol. 799, New Materials for optical waveguides, (1987).
11. A. M. Scheggi, R. Falciai and G. Gironi: 'Characterisation of oxide glass for hollow-core middle IR fibers', App. Optics., 24, (24), pp 4392–4394, (1985).
12. V. M. Zolotarev and V. N. Morozov: 'Optical constants of $GeO_2$ oxides in the 4000–200 $cm^{-1}$ region', Opt. Spectrosc., 34, pp 181–182, (1973).
13. T. Hidaka, K. Kumada, J. Shimada and T. Morikawa: '$GeO_2$—$ZnO$—$K_2O$ glass as the cladding material on 940 $cm^{-1}$ $CO_2$ laser light transmitting hollow core waveguide', J. Appl. Phys. (U.S.A.), 53, pp 5484–5490, (1982).

We claim:

1. A hollow glass waveguide comprising a glass cladding containing germanium dioxide ($GeO_2$) and at least one modifying metal oxide; characterised in that:
   the $GeO_2$ is present in the cladding at a concentration in excess of 90 mole %;
   and provided that the cladding does not comprise a binary combination of $GeO_2$ and PbO.
2. A hollow glass waveguide according to claim 1 wherein the concentration of $GeO_2$ in the cladding is at least 93 mole %.
3. A hollow glass waveguide according to claim 1 wherein the concentration of $GeO_2$ in the cladding is at least 94 mole %.
4. A hollow glass waveguide according to claim 1 wherein the concentration of $GeO_2$ in the cladding is at least 95 mole %.
5. A hollow glass waveguide according to any one of the preceding claims wherein the concentration of $GeO_2$ in the cladding does not exceed 99 mole %.
6. A hollow glass waveguide according to claim 1 containing as said at least one modifying metal oxide a network modifier selected from $K_2O$, $Li_2O$ and $Na_2O$.

7. A hollow glass waveguide according to claim 1 containing as said at least one modifying metal oxide an intermediate modifier selected from ZnO, $Al_2O_3$, $Sb_2O_3$, PbO and $Bi_2O_3$.

8. A hollow glass waveguide according to claim 1 wherein the cladding comprises a binary combination of $GeO_2$ and an oxide selected from $Li_2O$, $Na_2O$, ZnO, $Al_2O_3$ and $Sb_2O_3$.

9. A hollow glass waveguide according to claim 8 wherein the cladding comprises a binary combination of $GeO_2$ and $Sb_2O_3$.

10. A hollow glass waveguide according to claim 1 wherein the cladding comprises at least two modifying metaloxides selected from $K_2O$, $Li_2O$, $Na_2O$, PbO, ZnO, $Sb_2O_3$ and $Al_2O_3$.

11. A hollow glass waveguide according to claim 1 wherien the cladding comprises a ternary combination of $GeO_2$, a network modifier selected from $K_2O$, $Li_2O$ and $Na_2O$ and an intermediate modifier selected from ZnO, $Al_2O_3$, $Sb_2O_3$, PbO and $Bi_2O_3$.

12. A hollow glass waveguide according to claim 11 wherein the cladding comprises up to 99 mole % $GeO_2$ together with 0.5-9.5 mole % of a network modifier and 0.5-9.5 mole % of an intermediate modifier.

13. A hollow glass waveguide according to claim 11 comprising $Al_2O_3$ as intermediate modifier.

14. A hollow glass waveguide according to claim 11 comprising $Na_2O$ as network modifier.

15. A hollow glas waveguide according to claim 1 wherein the cladding comprises about 94 mole % $GeO_2$, about 3 mole % $Na_2O$ and about 3 mole % $Al_2O_3$.

16. A hollow glass waveguide according to claim 1 which comprises a naked glass cladding.

* * * * *